Patented Nov. 4, 1947

2,430,385

UNITED STATES PATENT OFFICE 2,430,385

VULCANIZATION OF BUTADIENE-STYRENE COPOLYMER HAVING DISPERSED THEREIN PARACOUMARONE RESIN AND FILLER

Theodore A. Bulifant, Hackensack, N. J., assignor to Allied Chemical & Dye Corporation, New York, N. Y., a corporation of New York No Drawing. Application February 10, 1944, Serial No. 521,845

9 Claims. (Cl. 260—41)

This invention relates to compounding substitutes for natural rubber and more particularly to compounding butadiene-styrene copolymer.

Black vulcanizates (products of vulcanization) of butadiene-styrene copolymer, frequently designated as Buna S and more recently as GR–S synthetic rubber, of commercially satisfactory tensile strength and otherwise suitable for many practical uses may be obtained by incorporating in the copolymer prior to vulcanization certain carbon-black fillers, particularly channel black. There is, however, a large industry and consumer demand for vulcanized rubber and rubber-like products of light color, e. g., white, gray, red, etc. This cannot be met by black vulcanizates containing carbon-black fillers. In the case of natural rubber, this need has been met successfully by using white or light-colored fillers such as calcium carbonate, clay, etc. It has been found, however, that such fillers, satisfactorily employed in making non-black vulcanizates from natural rubber, do not impart to butadiene-styrene copolymer sufficient tensile strength and tear resistance to permit the manufacture from them of satisfactory, and in many cases salable, products.

It is an object of this invention to improve the tear-resisting and tensile properties of vulcanizates of butadiene-styrene copolymer containing non-black fillers of inorganic origin.

It is a further object of the invention to provide a process of compounding butadiene-styrene copolymer with non-black inorganic fillers so as to obtain vulcanizates of improved tensile and tear-resisting properties. Other objects and advantages will appear hereinafter.

This invention involves the discovery that, by compounding butadiene-styrene copolymer with non-black inorganic fillers selected from the group consisting of calcium carbonate and magnesium carbonate of particle size such that at least 90% of the filler particles do not exceed 15 microns in diameter and with paracoumarone resin of a melting point above 75° C., preferably within the range of 100° to 140° C. an unexpected improvement in the tensile and tear-resisting properties of the copolymer vulcanizates is obtained. Preferably the copolymer is compounded with the filler and the paracoumarone resin in proportions of from 20 to 60 parts by volume of filler to each 100 parts by volume of the copolymer and with from 15 to 30 parts by weight of paracoumarone resin for each 100 parts by weight of the copolymer.

A vulcanizing agent, usually sulfur, vulcanizing accelerator and a metallic oxide which activates the accelerator are also dispersed in the copolymer prior to vulcanization.

I have found that by compounding butadiene-styrene copolymer with such fillers and paracoumarone resin of a melting point above 75° C., a surprising increase in the tensile strength and tear resistance of the vulcanizates, as compared with vulcanizates containing similar amounts of the same filler and other softeners or no softener, is accomplished. The elongations of the vulcanizates under given stress and at the breaking point are also increased and the abrasion resistance of the vulcanizates compares favorably with that of vulcanizates containing no softener or other softeners. The improvement is of such magnitude that the vulcanizates produced in accordance with the invention may be employed for purposes for which non-black butadiene-styrene copolymer vulcanizates heretofore had little or no utility. For example, as described more fully hereinbelow, use of the paracoumarone resin according to the invention increased the tensile strength of vulcanizates to as much as two or three times that of vulcanizates containing no paracoumarone resin. Heretofore, non-black butadiene-styrene copolymer vulcanizates compounded with non-black fillers possessed insufficient tensile strength or tear resistance or both for most purposes for which the corresponding non-black natural rubber vulcanizates were employed. However, non-black vulcanizates compounded in accordance with the invention, owing to their improved tensile and tear-resisting properties, may be satisfactorily employed as substitutes for vulcanized non-black natural rubber in most applications.

The calcium and magnesium carbonates employed in carrying out the invention are of fine or ultra-fine particle size. For optimum performance, average particle sizes of 1.0 micron or less are preferred, but larger particle sizes, up to 15 microns, may also be used effectively. With particle sizes progressively greater than 15 microns, there is a progressive degradation in mechanical properties, which precludes significant advantages, i. e., 90% of the particles should not exceed 15 microns in diameter or thickness.

The paracoumarone resin employed in accordance with the invention may be produced by catalytic or heat polymerization of the polymerizable constituents of oils recovered from coal-tar and water-gas-tar by distillation, oils obtained in the production of such tars and oils collecting in manufactured gas distribution and storage systems. Examples of such oils are solvent naphtha, crude benzol, toluol, and xylol, light oil and drip oils. Such oils contain varying but substantial amounts of unsaturated resin-forming constituents such as coumarone, indene, styrene and their homologs, and the resins produced from these oils may contain polymerization products of two or more of these constituents. The oil fractons employed in making the resins boil within the range of 125° to 200° C., preferably 150° to 200° C., and may contain minor amounts of polymerizable materials boiling without these ranges. The relative amounts of constituents in commercial resins and the physical properties of the resins will depend on several factors, well known in the art, such as, for example, boiling range of the oil fraction, temperature and time of polymerization, nature and amount of catalyst used, if any. Starting with a given oil fraction, the composition and properties of resins will depend largely on polymerization conditions, e. g., whether polymerization is effected by heat or by use of a catalyst such as 66° Bé. sulfuric acid. The expression "paracoumarone resin" as employed herein includes such catalyst - polymerized and heat - polymerized products. As hereinabove pointed out, the resin should have a melting point of at least 75° C., preferably between 100° and 140° C. If desired, resin of the preferred melting point may be made by blending paracoumarone resin of high melting point, say 160° C., with sufficient high boiling oil, e. g., coal-tar oil boiling within the range of 200° to 350° C., to produce a mixture of the desired melting point.

In addition to the filler and paracoumarone resin the butadiene-styrene copolymer should be compounded with suitable amounts of vulcanizing agent, preferably sulfur, vulcanizing accelerator, aliphatic fatty acid such as stearic acid, and a metallic oxide which activates the accelerator. The sulfur is employed in proportions by weight of from 1 to 5 parts, preferably about 2 parts for each 100 parts of the copolymer. Any accelerator capable of accelerating vulcanization of the copolymer either alone or in combination with an activating accelerator, may be utilized. Examples of the accelerator types are: aldehyde-amines, such as formaldehyde-aniline reaction products and butyraldehyde-aniline reaction products; guanidines, such as diphenylguanidine and diphenylguanidine oxalate; thiazoles, such as 2-mercaptobenzothiazole, mixed dimethyl and ethyl thiazyldisulfides, and benzothiazyl-2-monocyclohexylsulfenamide; thiazolines, such as mercaptothiazoline; thiuram sulfides, such as tetramethylthiuram monosulfide and tetramethylthiuram disulfide; and dithiocarbamates, such as n-pentamethylene ammonium pentmethylenedithiocarbamate and zinc dimethyldithiocarbamate. From 3 to 10 parts by weight of a metallic oxide capable of activating the accelerator, preferably about 5 parts of zinc oxide, should be incorporated in each 100 parts of the copolymer; other accelerator-activating metallic oxides are litharge and magnesium oxide.

Dispersion of the paracoumarone resin filler and other compounding ingredients in the butadiene-styrene copolymer may be accomplished in various ways utilizing conventional equipment of the type employed for compounding natural rubber, e. g., rubber mills of the roll type or internal mixers such as the Banbury mixer. For example, a master batch of the copolymer and paracoumarone resin may be made by thoroughly dispersing in the copolymer a high proportion of paracoumarone resin, e. g., 20 to 100 parts by weight of the resin for each 100 parts of the copolymer, and milling a sufficient amount of the master batch with copolymer containing no resin and with the other compounding ingredients to produce a compound containing the desired proportions of the various materials. Alternatively, the sulfur may be first dispersed in the copolymer by milling and the other compounding ingredients then dispersed. If desired, the sulfur may be first dissolved in the paracoumarone resin by heating the sulfur and resin together, the resultant resin-sulfur blend dispersed in the copolymer followed by dispersion of the filler, activating metal oxide and accelerator. It is desirable, particularly when employing accelerators having a tendency to scorch the copolymer, to incorporate the accelerator after the other compounding materials in order to prevent scorching during the compounding operation.

The following examples are further illustrative of the invention:

*Example 1*

| | Parts by weight |
|---|---|
| Butadiene-styrene copolymer | 100 |
| Paracoumarone resin (melting point 115°–125° C.) | 25 |
| Calcium carbonate | 150 |
| Sulfur | 2 |
| Zinc oxide | 5 |
| Benzothiazyl-2 - monocyclohexyl sulfenamide (accelerator) | 1.75 |
| | 283.75 |

The paracoumarone resin employed was produced by polymerization of the resin-forming constituents of coal-tar and water-gas-tar fractions boiling within the range of 150° to 200° C. with concentrated (66° Bé.) sulfuric acid and was constituted chiefly of the polymers of indene, coumarone and homologs of styrene. The calcium carbonate was a finely divided precipitated product, most of which was of a particle size not exceeding 0.5 micron. The amount of the carbonate corresponded to about 55 parts by volume per 100 parts by volume of the butadiene-styrene copolymer.

The butadiene-styrene copolymer was milled for 5 to 10 minutes at mill roll temperature of about 130° F. The mill roll temperature was then raised to about 170° to 180° F. and the sulfur, zinc oxide, calcium carbonate and paracoumarone resin were added in the order named. The mill roll temperatures were then reduced, the accelerator was incorporated and the compound was sheeted to the desired thickness. The compound was then cured for 15 minutes at 307° F. corresponding to a steam pressure (gauge) of about 60 pounds per square inch.

*Example 2*

Butadiene-styrene copolymer was compounded and cured in the same manner as described in Example 1, except that instead of acid-polymerized paracoumarone resin, 25 parts by weight of heat-polymerized paracoumarone resin of a melting point of 100° to 115° C. constituted predominantly of heat polymers of indene, coumarone and styrene homologs were dispersed in the copolymer.

The vulcanizates of Examples 1 and 2 were light in color. They were tested both before aging and after aging for 7 days at 70° C. Test results are tabulated below. For purposes of comparison there are also given the results of similar tests on vulcanizates which contained no paracoumarone resin but which otherwise contained the same materials and were made by the same procedure as the vulcanizates of these examples.

|  | Properties of Vulcanizates of Example 1 | Properties of Vulcanizates of Example 2 | Properties of Vulcanizates containing no paracoumarone resin |
| --- | --- | --- | --- |
| Tear resistance (crescent) | 195 | 230 | 130 |
| Tensile strength (pounds per square inch): | | | |
| Unaged | 1,920 | 1,700 | 900 |
| Aged | 2,140 | 1,850 | 720 |
| Elongation (per cent at breaking point): | | | |
| Unaged | 830 | 840 | 460 |
| Aged | 730 | 740 | 340 |
| Modulus (300 per cent): | | | |
| Unaged | 200 | 200 | 400 |
| Aged | 220 | 260 | 600 |
| Abrasion resistance (du Pont) | 580 | 635 | 580 |

It will be observed that the tensile strengths of the vulcanizates of Examples 1 and 2 containing calcium carbonate filler and paracoumarone resin were about twice as great as that of the vulcanizate containing no paracoumarone resin. The combination of the filler and resin also materially increased the tear resistance and the elongations at the breaking point and for given stress of the vulcanizates. The vulcanizates containing the combination of calcium carbonate filler and paracoumarone resin possessed properties adapting them for use for most purposes for which non-black vulcanizates are required, while the vulcanizate containing no paracoumarone resin was not a satisfactory substitute for natural rubber vulcanizates.

*Example 3*

Parts by weight
Butadiene-styrene copolymer _____ 100
Paracoumarone resin (melting point 115°–125° C.) _____ 25
Magnesium carbonate _____ 75
Zinc oxide _____ 5
Stearic acid _____ 1.5
Sulfur _____ 2
Benzothiazyl - 2 - monocyclohexyl sulfenamide (accelerator) _____ 1.75

Total _____ 210.25

The paracoumarone resin was similar to that employed in Example 1 and the magnesium carbonate was a finely divided precipitated product of an average particle diameter or thickness of less than 1 micron. The materials were assembled as described in Example 1 and the resultant compound was cured for 20 minutes at 307° F. corresponding to a steam pressure (gauge) of about 60 pounds per square inch. Tests on the vulcanizate before aging and after aging for 7 days at 70° C. showed that as in the case of the vulcanizates of Examples 1 and 2, it possessed substantially greater tensile strength and tear resistance than a vulcanizate which was similarly prepared except that no paracoumarone resin was employed.

Thus it will be seen the invention markedly improves the tensile properties and tear resistance of vulcanizates of butadiene-styrene copolymer compounded with calcium and magnesium carbonate fillers of a particle size not exceeding 15 microns. This improvement renders the vulcanizates suitable for many purposes for which non-black vulcanizates of butadiene styrene copolymer heretofore has no utility owing to their low tensile strength and tear resistance. The invention provides a new class of vulcanizates suitable for the manufacture of articles such as drug sundries, e. g., hot water bottles, mechanical rubber goods, footwear, and household articles, for which black vulcanizates are not commercially acceptable. The vulcanizates of the invention are primarily adapted for relatively static uses in which they are not subjected to a high degree of repeated flexure and deformation but in some cases may be employed for various dynamic purposes.

The resin melting points given herein are determined by the cube-in-mercury method described in "Protective and Decorative Coatings," vol. 1, copyright 1941, by J. J. Matiello, pages 366–67, published by John A. Wiley & Sons, Inc., New York, New York. The melting point of 75° C., 100° C. and 140° C. determined by this method correspond approximately to melting points of 69° C., 88° C. and 119° C., respectively, as determined by ring and ball method (A. S. T. M. standard D36–26). The properties of the rubber given herein were determined by the following methods: Tear resistance (crescent) by A. S. T. M. method D624–41T (pounds per inch thickness); tensile strength, modulus and elongation by A. S. T. M. method D412–41 (¼" die); and abrasion resistance (du Pont) by A. S. T. M. method D394–40 (loss in c. c. per horsepower-hour). In all examples of the invention hereinabove given the particle size of the fillers conformed with the specifications therefor, noted on page 3 hereof.

Since certain changes may be made without departing from the scope of the invention, it is intended that the above shall be interpreted as illustrative and not in a limiting sense.

I claim:

1. A process of making vulcanizates of vulcanizable butadiene-styrene copolymer which comprises compounding the copolymer with vulcanizing agent, paracoumarone resin of a melting point above 75° C. and non-black inorganic filler selected from the group consisting of calcium carbonate and magnesium carbonate, at least 90% of which is of a particle size not exceeding 15 microns in proportions of from 15 to 30 parts by weight of the resin to 100 parts by weight of the copolymer and from 20 to 60 parts by volume of the filler to 100 parts by volume of the copolymer, and vulcanizing the resultant compound to a resilient vulcanizate.

2. A process as specified in claim 1 in which the filler is calcium carbonate of an average particle size of less than 1 micron.

3. A process as specified in claim 1 in which the filler is magnesium carbonate of an average particle size less than 1 micron.

4. A process of making butadiene-styrene copolymer vulcanizates of improved tensile strength and tear resistance which comprises compounding vulcanizable butadiene-styrene copolymer with non-black inorganic filler of the group consisting of calcium carbonate and magnesium carbonate, at least 90% of which is of a particle size not exceeding 15 microns, in proportions of from 20 to 60 parts by volume of the filler per 100 parts by volume of the copolymer, 15 to 30 parts by weight of paracoumarone resin of a melting point of from 100° to 140° C. per 100 parts by weight of the copolymer, from 1 to 5 parts by weight of sulfur per 100 parts by weight of copolymer, vulcanizing accelerator and from 3 to 10 parts by weight of an accelerator-activating metallic oxide per 100 parts by weight of the copolymer, and vulcanizing the resultant compound.

5. A process of making butadiene-styrene copolymer non-black vulcanizates of improved tensile strength and tear resistance which comprises compounding vulcanizable butadiene-styrene copolymer with from 20 to 60 parts by volume of non-black inorganic filler of an average particle size less than 1 micron per 100 parts by volume of the copolymer, said filler being selected from the group consisting of calcium carbonate and magnesium carbonate, 15 to 30 parts by weight of paracoumarone resin of a melting point of from 100° to 140° C. per 100 parts by weight of the copolymer, from 1 to 5 parts by weight of sulfur per 100 parts by weight of copolymer, vulcanizing accelerator, and, as an accelerator activator, from 3 to 10 parts of zinc oxide per 100 parts by weight of the copolymer, and vulcanizing the resultant compound.

6. A vulcanizate of improved tensile strength prepared by vulcanizing a compound containing vulcanizable butadiene-styrene copolymer, from 20 to 60 parts by volume of non-black inorganic filler of the group consisting of calcium carbonate and magnesium carbonate, at least 90% of which is of a particle size not exceeding 15 microns per 100 parts by volume of the copolymer, vulcanizing agent, and 15 to 30 parts by weight of paracoumarone resin of a melting point above 75° C. per 100 parts by weight of the copolymer, said vulcanizing agent being present in amounts to yield a resilient vulcanizate.

7. A vulcanizate as specified in claim 6 in which the filler is calcium carbonate of an average particle size not exceeding 1 micron.

8. A vulcanizate as specified in claim 6 in which the filler is magnesium carbonate of an average particle size less than 1 micron.

9. A vulcanizate of improved tensile strength prepared by vulcanizing a compound containing vulcanizable butadiene-styrene copolymer, from 1 to 5 parts by weight of sulfur per 100 parts by weight of the copolymer, from 20 to 60 parts by volume of non-black inorganic filler of the group consisting of calcium carbonate and magnesium carbonate, at least 90% of which is of a particle size not exceeding 15 microns per 100 parts by volume of the copolymer and 15 to 30 parts by weight of paracoumarone resin of a melting point within the range of 100° to 140° C. per 100 parts by weight of the copolymer.

THEODORE A. BULIFANT.

REFERENCES CITED

The following references are of record in the file of this patent:

UNITED STATES PATENTS

| Number | Name | Date |
|---|---|---|
| 1,248,226 | Wells | Nov. 27, 1917 |